United States Patent
Sasahara

(10) Patent No.: US 12,153,844 B2
(45) Date of Patent: Nov. 26, 2024

(54) IMAGE FORMING APPARATUS, INFORMATION PROCESSING METHOD, AND STORAGE MEDIUM FOR MINING PROCESSING

(71) Applicant: CANON KABUSHIKI KAISHA, Tokyo (JP)

(72) Inventor: Naoto Sasahara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/363,510

(22) Filed: Aug. 1, 2023

(65) Prior Publication Data

US 2024/0045633 A1 Feb. 8, 2024

(30) Foreign Application Priority Data

Aug. 4, 2022 (JP) ................................ 2022-124674

(51) Int. Cl.
*G06F 3/12* (2006.01)
*H04L 9/00* (2022.01)

(52) U.S. Cl.
CPC .......... *G06F 3/1267* (2013.01); *G06F 3/1203* (2013.01); *H04L 9/50* (2022.05)

(58) Field of Classification Search
None
See application file for complete search history.

(56) References Cited

U.S. PATENT DOCUMENTS

2011/0310428 A1* 12/2011 Ciriza ................ H04N 1/00323
358/1.15

FOREIGN PATENT DOCUMENTS

| CN | 111240607 B | * | 1/2024 | .......... G06F 3/1237 |
| JP | 2019101797 A | | 6/2019 | |
| JP | 2020043416 A | * | 3/2020 | |

OTHER PUBLICATIONS

English translation of JP-2020043416-A. (Year: 2020).*
English translation of CN-111240607-B. (Year: 2024).*

* cited by examiner

*Primary Examiner* — Thomas D Lee
(74) *Attorney, Agent, or Firm* — Canon U.S.A., Inc. IP Division

(57) ABSTRACT

An image forming apparatus includes one or more memories and one or more processors. The one or more processors and the one or more memories are configured to execute mining processing and are configured to execute a job, wherein the mining processing and the job are not executed at a same time.

11 Claims, 9 Drawing Sheets

FIG. 6

| MINING HISTORY | | |
|---|---|---|
| No | EXECUTION TIME | POWER CONSUMPTION |
| HISTORY 1 | START: 2024/8/8 9:00<br>END: 2024/8/8 10:00 | 0.3kw |
| - | START: -<br>END: - | - |
| - | START: -<br>END: - | - |
| - | START: -<br>END: - | - |

◁ ▷

CLOSE

| LOGOUT | | | |
|---|---|---|---|
| 1 | 2 | 3 | |
| 4 | 5 | 6 | |
| 7 | 8 | 9 | |
| * | 0 | # | |
| C | RESET | | |

START

STATUS CHECK/CANCEL

IMAGE FORMING APPARATUS, INFORMATION PROCESSING METHOD, AND STORAGE MEDIUM FOR MINING PROCESSING

BACKGROUND

Field of the Disclosure

The present disclosure relates to an image forming apparatus, an information processing method, and a storage medium.

Description of the Related Art

Japanese Patent Application Laid-Open No. 2019-101797 discusses a configuration in which a plurality of terminals is used and mining is performed using surplus electricity of each terminal.

SUMMARY

According to an aspect of the present disclosure, an image forming apparatus includes one or more memories and one or more processors. The one or more processors and the one or more memories are configured to execute mining processing and are configured to execute a job, wherein the mining processing and the job are not executed at a same time.

Further features of various embodiments will become apparent from the following description of exemplary embodiments with reference to the attached drawings.

BRIEF DESCRIPTION OF THE DRAWINGS

FIG. 6 is a diagram illustrating one example of a mining history screen.

DESCRIPTION OF THE EMBODIMENTS

Exemplary embodiments of the present disclosure are described with reference the drawings. It is to be understood that following exemplary embodiments are not intended to limit the claims of the present disclosure, and that not all of the combinations of the aspects that are to be described in the following embodiments are necessarily required in every embodiment of the present disclosure.

Figure 1:
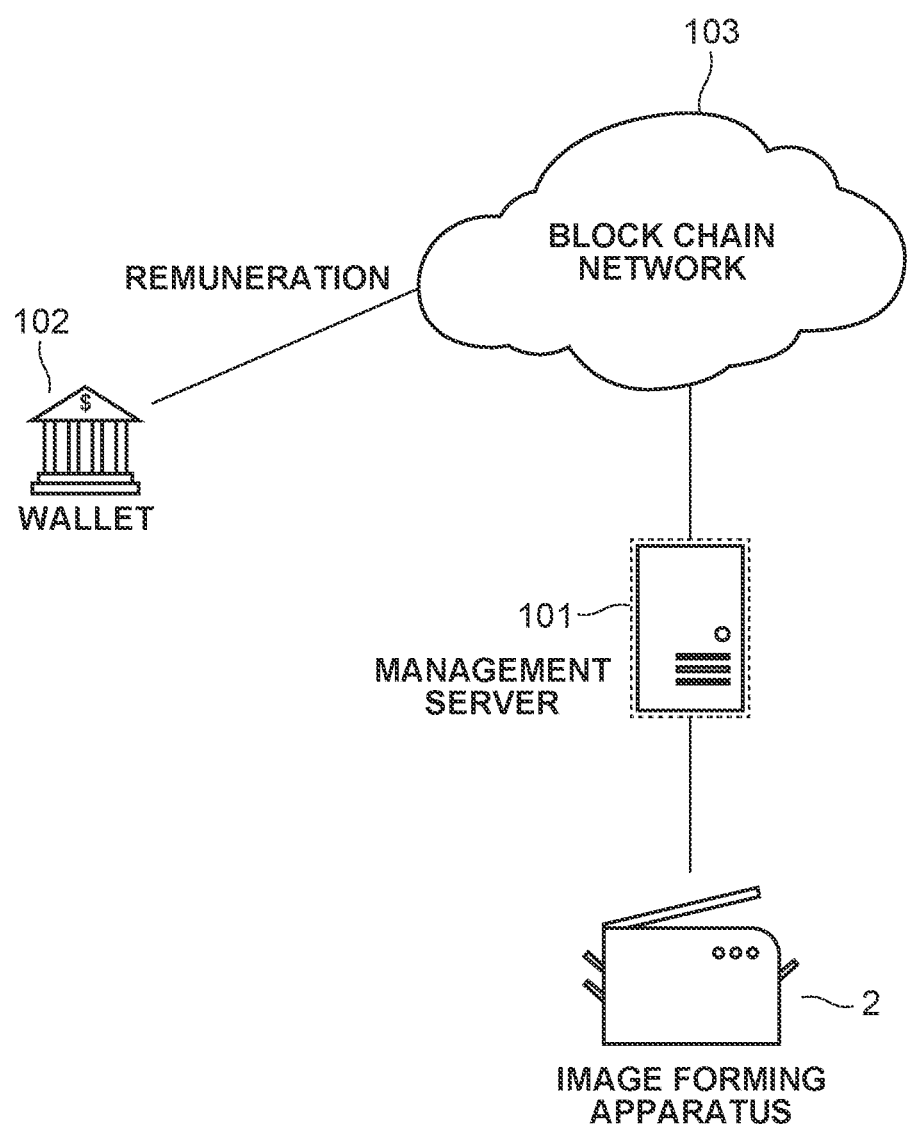
FIG. 1 is a diagram illustrating one example of a system configuration according to the present disclosure.

A first exemplary embodiment is to be described. FIG. 1 is a diagram illustrating one example of a system configuration according to the present exemplary embodiment. An image forming apparatus 2 is connected to a management server 101 as an information processing apparatus via a network. The management server 101 is connected to a block chain network 103, and is linked to a wallet 102. The latest block chain information can be acquired by accessing the block chain network 103. The block chain network 103 includes a plurality of block chain servers, and the management server 101 communicates with any of the block chain servers to access the block chain network 103. The wallet 102 is registered with an application inside a personal computer (PC) (not illustrated).

There are blocks in the block chain network 103, and each block includes an area called a block header and a transaction. The block header contains a hash value of a previous block, a mining difficulty, a Merkle root, a nonce, and a timestamp. Among these pieces of information, the information other than the nonce is first determined when a new block is to be generated. Subsequently, when a nonce that satisfies a specific condition is found, the block is generated. The term "specific condition" used herein is a condition that a hash value calculated by a specific hash function based on a nonce and block header information is smaller than a predetermined threshold value (a mining difficulty). Calculation processing for finding a nonce that satisfies such a condition is called mining. The term "nonce" is an abbreviation for number used once. A virtual currency and a sum are provided as remuneration to a miner who first succeeds in mining. In a case where the image forming apparatus 2 performs mining, the image forming apparatus 2 communicates with the management server 101 to acquire information necessary for the mining. The image forming apparatus 2 transmits a result of the mining executed based on the information necessary for the mining to the management server 101. The management server 101 transmits the mining result to the block chain network 103, and remuneration is provided to a wallet linked to the management server 101 in a case where the mining has succeeded. In FIG. 1, there is one management server 101. In practice, there can be any number of management servers 101 to which the image forming apparatus 2 can be connected. The management server 101 can be a server such as a mining pool. The mining pool is a server that provides a mechanism by which a certain amount of remuneration is distributed based on an amount of calculation contributed to the mining even in a case where the mining has not succeeded.

Figure 2:
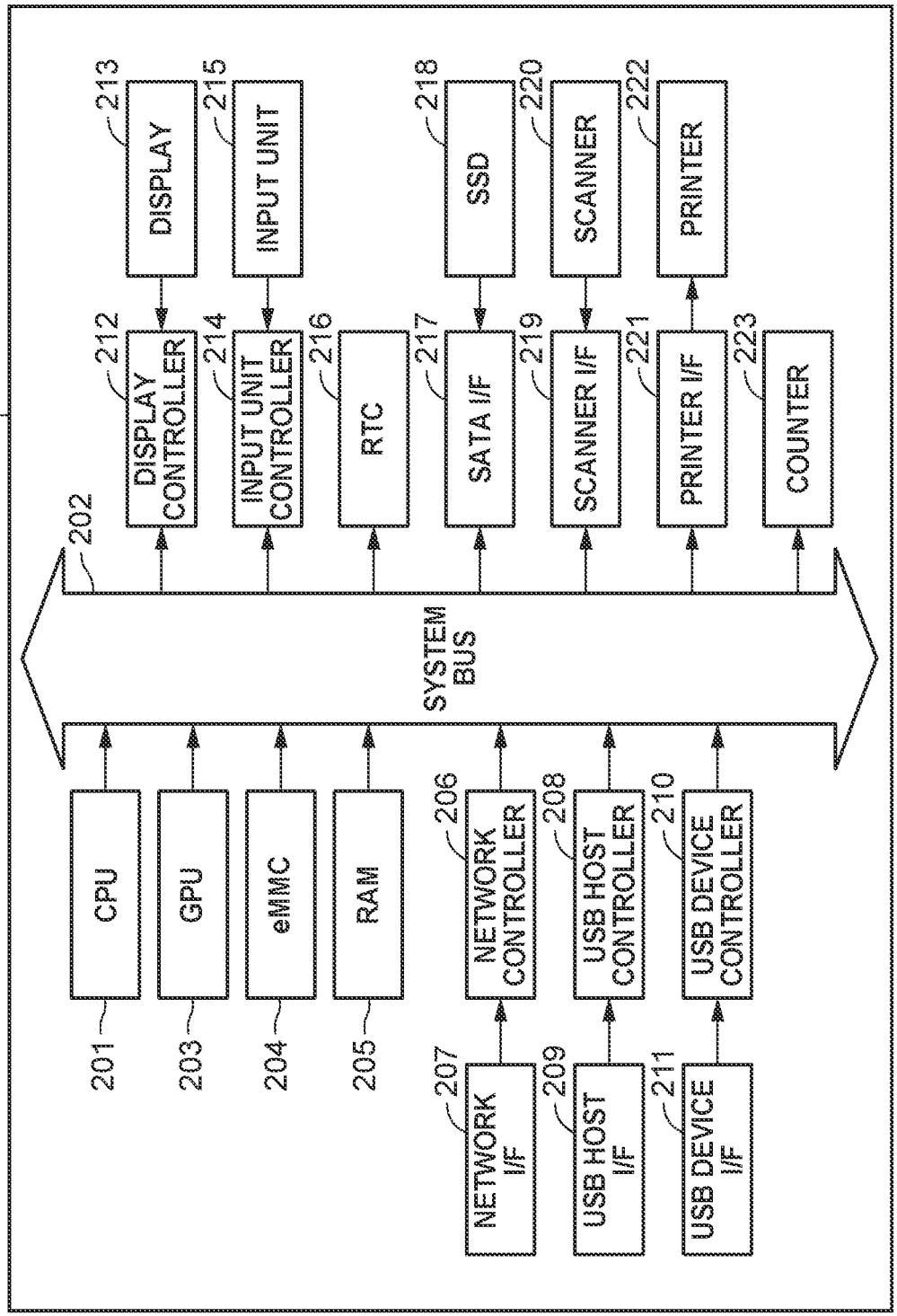
FIG. 2 is a diagram illustrating one example of a hardware configuration of an image forming apparatus.

FIG. 2 is a diagram illustrating one example of a hardware configuration of the image forming apparatus 2.

A central processing unit (CPU) 201 causes software for operation of the image forming apparatus 2 to work. A system bus 202 is a path through which not only the CPU 201 accesses other units but also other units access one another. A graphic processing unit (GPU) 203 performs image processing and mining calculation. The GPU 203 has a cache area in which calculation data is temporarily stored.

An embedded multi-media card (eMMC) 204 stores software for the image forming apparatus 2, a database necessary for operation of the image forming apparatus 2, and a temporarily saved file.

A program for the image forming apparatus 2 is loaded in a random access memory (RAM) 205. The RAM 205 serves as a storage area for variables in a program operation, and data transferred from each unit by direct memory access (DMA).

A network controller 206 controls a network interface (I/F) 207. Such control of the network OF 207 enables the image forming apparatus 2 to communicate with other devices on the network.

A universal serial bus (USB) host controller 208 controls a USB host I/F 209, thereby controlling communication between the image forming apparatus 2 and a USB device.

A USB device controller 210 controls a USB device OF 211, thereby controlling communication between the image forming apparatus 2 and a USB host.

A display controller 212 controls a display 213, so that various information is displayed.

An input unit controller 214 controls an input unit 215, so that an input of operation and an input of information from a user are received. Particular examples of the input unit 215 include a keyboard, a mouse, a numeric keypad, a cursor key, and a touch panel. In a case where the input unit 215 is a touch panel, the input unit 215 is physically attached to a surface of the display 213.

A real time clock (RTC) 216 has a clock function, an alarm function, and a timer function. A solid state drive (SSD) 218 is connected to the system bus 202 via a serial advanced technology attachment (SATA) OF 217. For example, a large size file and temporary data of an application are stored in the SSD 218.

The CPU 201 controls a scanner 220 via a scanner OF 219, so that a document is scanned and image data is generated. The scanner 220 includes an automatic document feeder (ADF) (not illustrated). Thus, the scanner 220 can convey a document placed on a document tray to scan the document.

The CPU 201 controls a printer 222 via a printer OF 221, so that an image is printed on a sheet based on the image data which has been input. The number of sheets on which images are printed by the printer 222 is recorded in a counter 223.

In a case where a resource of the image forming apparatus 2 for mining processing and a resource for job execution are the same, both processing may be executed slowly. For example, the GPU 203 may be being used for executing mining processing, and at the same time, a job that uses the GPU 203 may be executed. In such a case, neither the mining processing nor the job can be executed at the maximum efficiency. Particularly, in a case where a usage rate of the GPU 203 is 95% in the mining processing, execution of a job for which a usage rate of the GPU 203 is normally 10% causes exceedance of processing capability of the GPU 203. Consequently, the job cannot be executed at the maximum efficiency. In view of such an issue, the following processing is executed to prevent execution of mining processing from causing a longer period of time for executing a job of the image forming apparatus 2.

Figure 3:
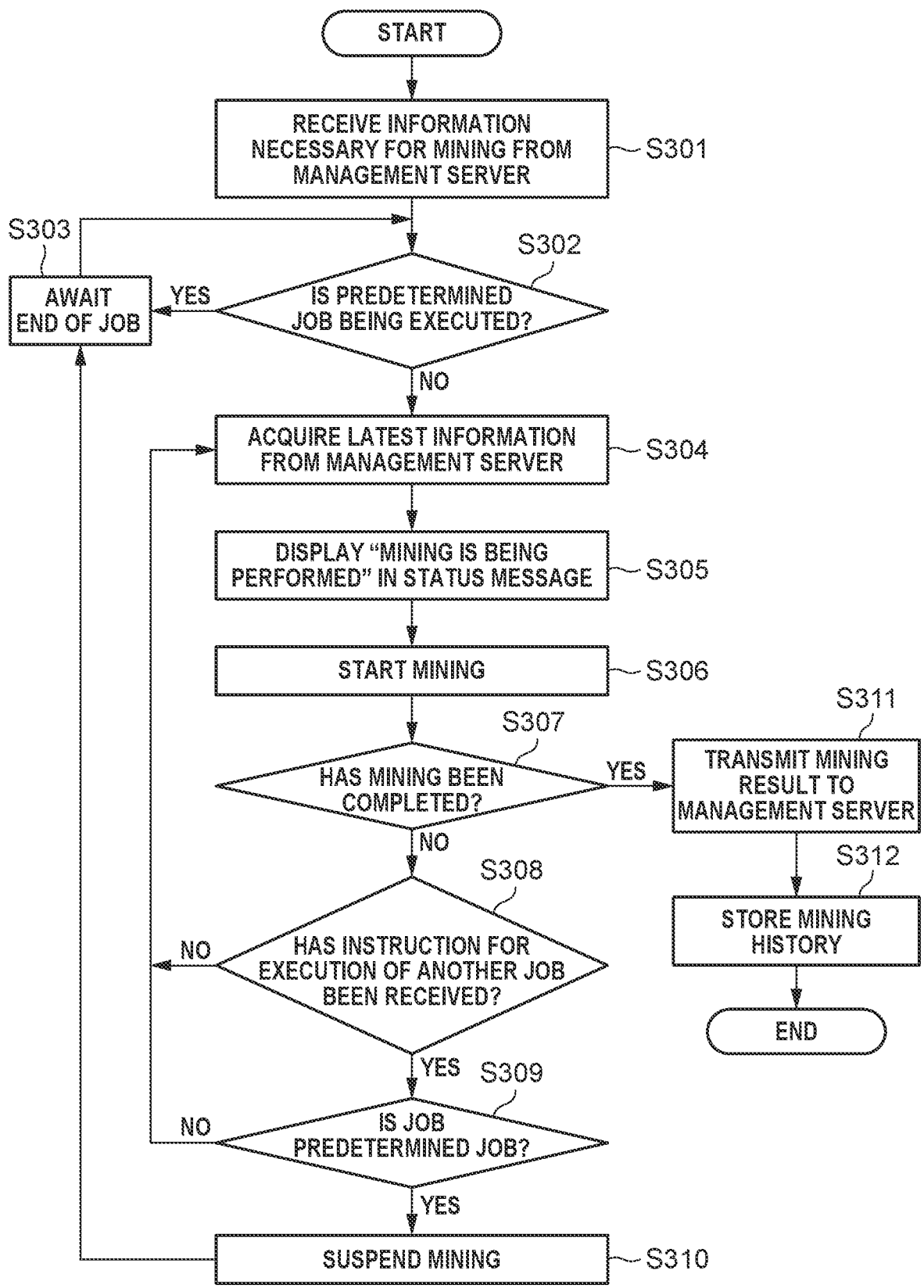
FIG. 3 is a flowchart illustrating one example of mining processing executed by the image forming apparatus.

FIG. 3 is a flowchart illustrating one example of mining processing executed by the image forming apparatus 2.

The CPU 201, the GPU 203, or both of the CPU 201 and the GPU 203 read out a program stored in the eMMC 204 into the RAM 205 to execute the program, thereby executing the processing of the flowchart illustrated in FIG. 3.

In step S301, upon receipt of a mining processing execution instruction, the CPU 201 requests information necessary for the mining from the management server 101 via the network OF 207, and receives the information. The information to be received includes a plurality of nonce candidate values, a hash algorithm, a hash threshold value, and a block header of a block including a new transaction. These pieces of information are temporarily stored in a storage such as the RAM 205 and the SSD 218. The nonce candidate values are provided based on the assumption that the nonce candidate values are generated by the management server 101 and managed such that candidate values to be verified by respective mining terminals do not overlap each other. However, nonce candidate values may be generated by the image forming apparatus 2 which executes mining.

In step S302, the CPU 201 determines whether a predetermined job is being executed. The predetermined job is a job that needs image processing using the GPU 203. For example, the predetermined job is a job involving an operation such as fax transmission, fax reception, printing, and scanning. Examples of jobs not involving such operations include a hold print job and a BOX send job. That is, a job on which image processing has been already performed prior to job execution is not considered as the predetermined job. A determination criterion for step S302 is not limited to the aforementioned example. For example, a job with a resource occupancy rate that is higher than a threshold value may be considered as the predetermined job. The resource occupancy rate herein is an occupancy rate of a resource such as the CPU 201 and the RAM 205 of the image forming apparatus 2.

In a case where the CPU 201 determines that the predetermined job is being executed (YES in step S302), the processing proceeds to step S303. In step S303, the CPU 201 waits for the end of the job. In a case where the CPU 201 determines that the predetermined job is not being executed (NO in step S302), the processing proceeds to step S304. In step S304, the CPU 201 receives the latest information necessary for the mining from the management server 101. In the present exemplary embodiment, execution of the mining processing is not started until the predetermined job ends. However, in a case where the CPU 201 receives a mining processing execution instruction while the predetermined job is being executed, the mining processing can be cancelled.

In step S305, the CPU 201 displays "mining is being performed" in a status message that is displayed on the display 213. Subsequently, in step S306, the CPU 201 instructs the GPU 203 to start the mining. The processing in step S304 is performed to reduce waste mining as little as possible by communication that is regularly performed between the CPU 201 and the management server 101. The processing in step S304 can be performed at any position in the flowchart illustrated in FIG. 3. Upon receipt of the instruction, the GPU 203 calculates a hash value based on the hash algorithm by reference to the block header and the nonce candidate values received in step S304, and verifies whether the calculation result is lower than a hash threshold value. Such processing is performed by the GPU 203 in a parallel manner until there is no more nonce candidate value that has not been verified or a nonce candidate value that is lower than the hash threshold value is found. In step S307, the CPU 201 determines whether the mining has been completed. In a case where the CPU 201 determines that the mining has been completed (YES in step S307), the processing proceeds to step S311. In a case where the CPU 201 determines that the mining has not been completed (NO in step S307), the processing proceeds to step S308.

In step S308, the CPU 201 determines whether an instruction for executing another job has been received.

In a case where the CPU 201 determines that the instruction for executing another job has been received (YES in step S308), the processing proceeds to step S309. In a case where the CPU 201 determines that the instruction for executing another job has not been received (NO in step S308), the processing returns to step S309.

In step S309, the CPU 201 determines whether the job to be executed based on the instruction received in step S308 is the predetermined job. That is, the CPU 201 determines whether the job to be executed based on the instruction which has been issued while the mining is being performed is a job that satisfies a condition that is the same as the determination criterion for step S302. In a case where the CPU 201 determines that the job is the predetermined job (YES in step S309), the processing proceeds to step S310. In a case where the CPU 201 determines that the job is not the predetermined job (NO in step S309), the processing returns to step S304.

In step S310, the CPU 201 suspends the mining processing being executed by the GPU 203. The calculation data in the cache area of the GPU 203 is temporarily saved in the RAM 205, the SSD 218, or the eMMC 204. When there is no more predetermined job being executed, the saved data is returned to the cache area of the GPU 203, and mining calculation is resumed. In a case where the mining processing is suspended in step S310, the CPU 201 changes the status message to be displayed on the display 213 to "mining is being suspended". In the present exemplary embodiment, the mining processing is suspended. However, in a case where an instruction for executing the predetermined job is received while the mining processing is being executed, the predetermined job can be cancelled, or execution of the predetermined job can be on standby until the mining processing is completed.

In step S311, the CPU 201 transmits a mining result to the management server 101, and the processing ends. A mining completion condition can be flexibly set. For example, the mining is completed on the condition that a time designated beforehand is reached, or the condition that the mining takes a certain period of time or the mining consumes a certain amount of electric power.

In step S312, the CPU 201 calculates an execution period and power consumption of the mining processing, and stores the calculation results as mining history in the SSD 218.

Figure 4:
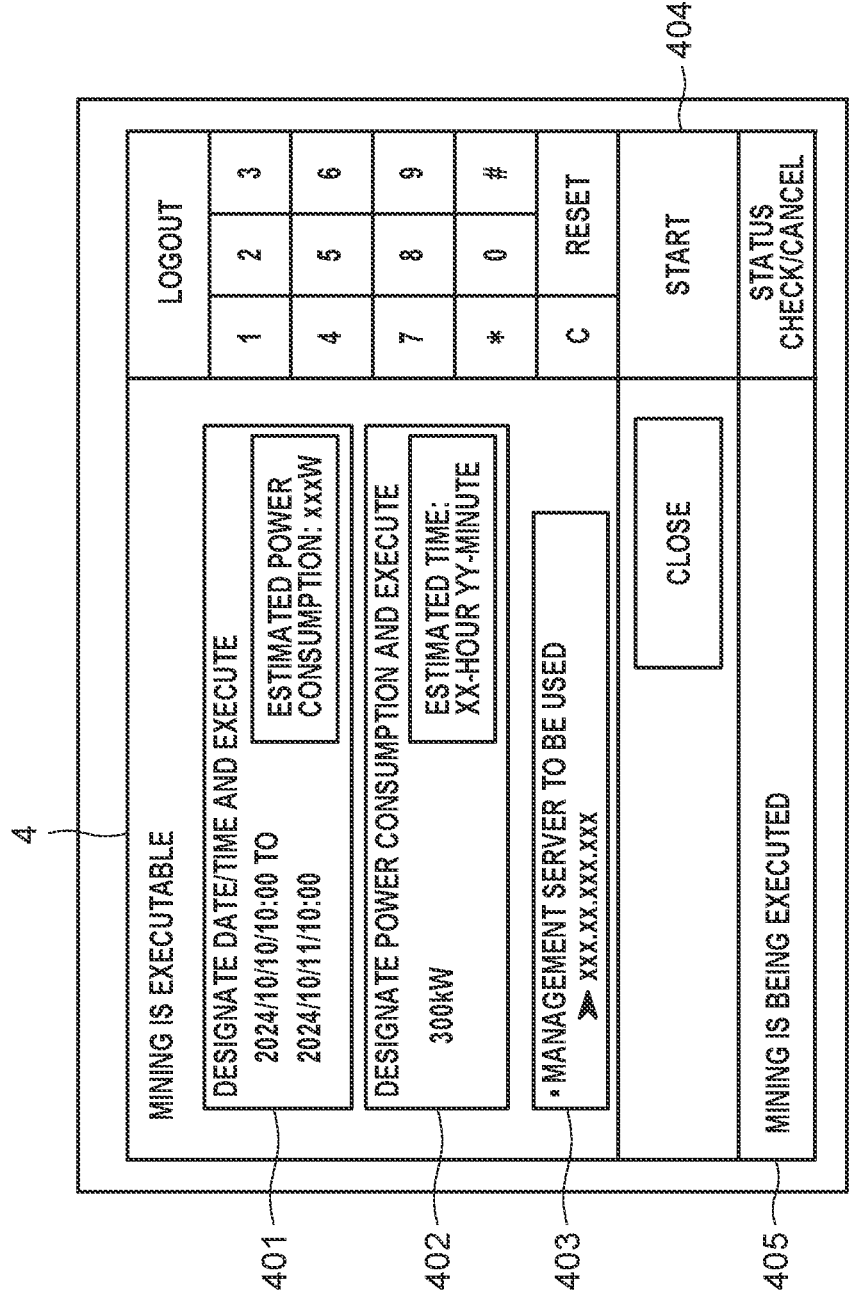
FIG. 4 is a diagram illustrating one example of a setting screen for mining.

FIG. 4 is a diagram illustrating one example of a setting screen for mining. In FIG. 4, a setting screen 4 is a setting screen for mining and is displayed on the display 213. The setting screen 4 has areas 401 to 405. In the area 401, a date and time on which mining processing is to be executed can be designated, and an estimated power consumption is displayed based on the execution time. In the area 402, power consumption can be designated, and estimated time that is to be consumed in the mining based on the power consumption is displayed. The estimated power consumption and the estimated time to be displayed are values that are calculated based on performance and a power consumption value of the GPU 203. In the area 403, a management server to be connected at the time of mining execution can be selected. A user presses a start button 404 in a state in which the mining is set in either the area 401 or 402, thereby designating execution of the mining. The processing illustrated in FIG. 3 is executed when the designated time has come or when the setting is performed in the area 402 and the start button 404 is pressed. A message indicating that the mining is being executed is displayed in the area 405 during execution of the mining.

Figure 5:
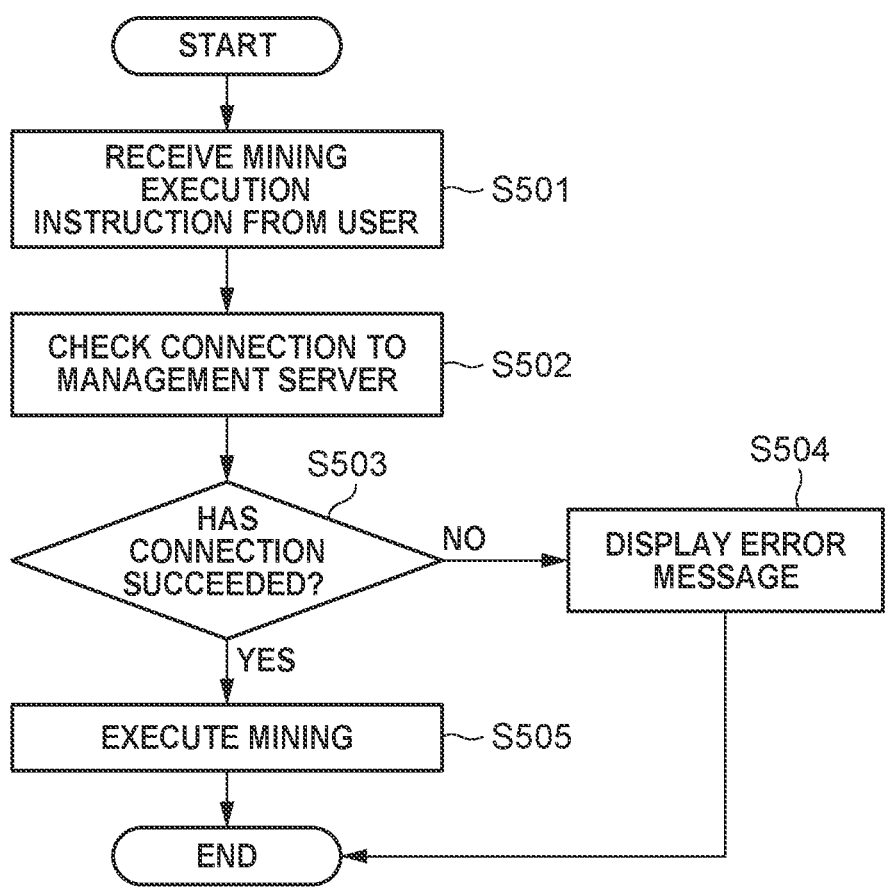
FIG. 5 is a flowchart illustrating processing performed when a user issues a mining instruction.

FIG. 5 is a flowchart illustrating processing performed when a user issues a mining instruction. In step S501, the CPU 201 receives a mining execution instruction when the user presses the start button 404.

In step S502, the CPU 201 checks connection to the management server 101.

In step S503, the CPU 201 determines whether the connection has succeeded. In a case where the CPU 201 determines that the connection has succeeded (YES in step S503), the processing proceeds to step S505. In a case where the CPU 201 determines that the connection has not succeeded (NO in step S503), the processing proceeds to step S504. In step S505, the CPU 201 starts mining processing. The mining processing herein is substantially the same as the processing illustrated in FIG. 3. In step S504, the CPU 201 displays an error message on the display 213.

FIG. 6 is a diagram illustrating one example of a mining history screen 6. The use of the mining history screen 6 displayed on the display 213 enables history of execution-completed mining to be checked. In the history, a period for which the mining has been executed and an amount of the power consumed are displayed.

Figure 7:
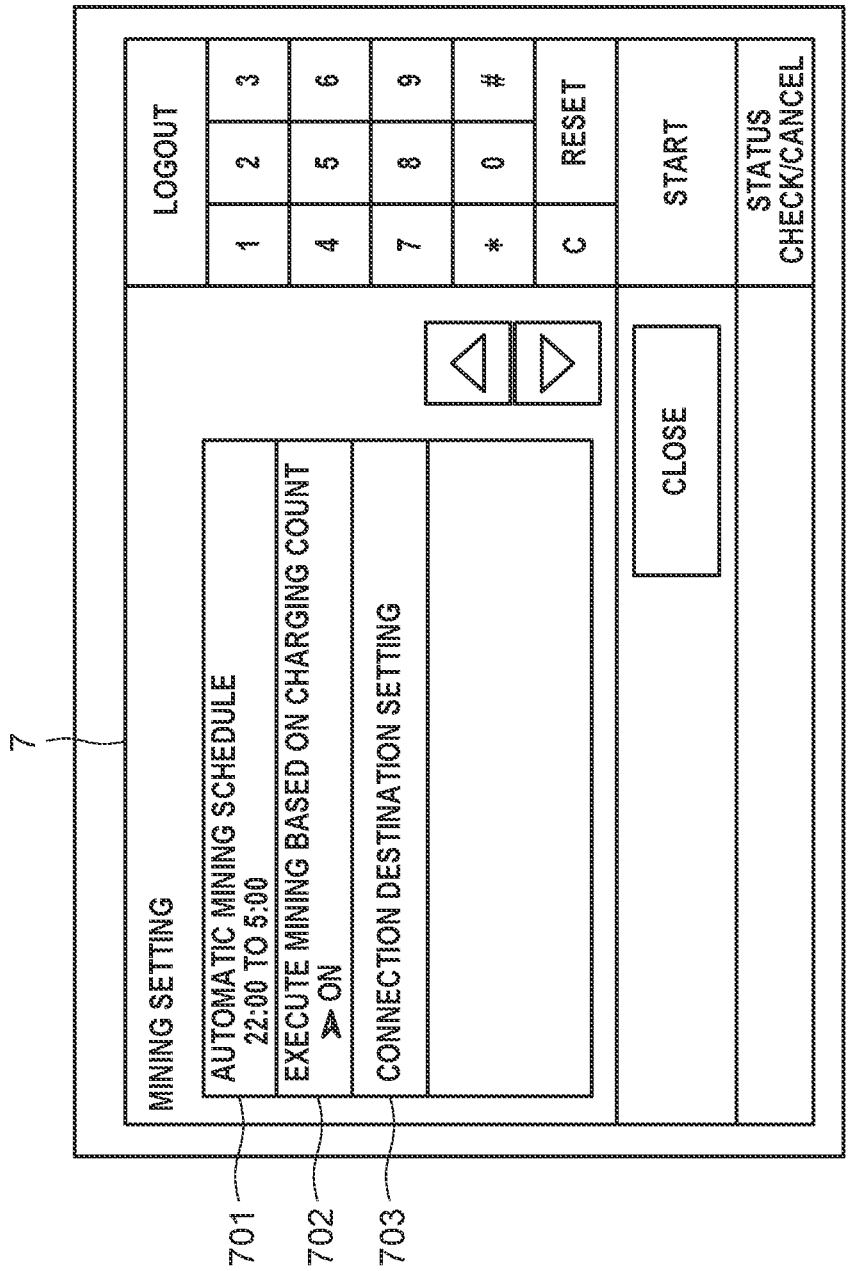
FIG. 7 is a diagram illustrating one example of a mining setting screen.

FIG. 7 is a diagram illustrating one example of a mining setting screen. Buttons 701, 702, and 703 are displayed and selectable on a mining setting screen 7 that is displayed on the display 213.

In a case where the button 701 is selected, a mining schedule can be set. Mining can be automatically repeated without a direct instruction from the user at a date and time, a day of the week, or a time that is designated by a user.

In a case where the button 702 is selected, a setting for either executing or not executing the mining processing based on a charging count can be made. In a case where the execution of the mining setting is set to "ON" by using the button 702, the mining processing is executed based on a charging count. Such mining processing is to be described in detail below in a second exemplary embodiment.

In a case where the button 703 is selected, connection destination information can be set. The connection destination information is set so that the user identifies a management server to be used in the mining.

Figure 9:
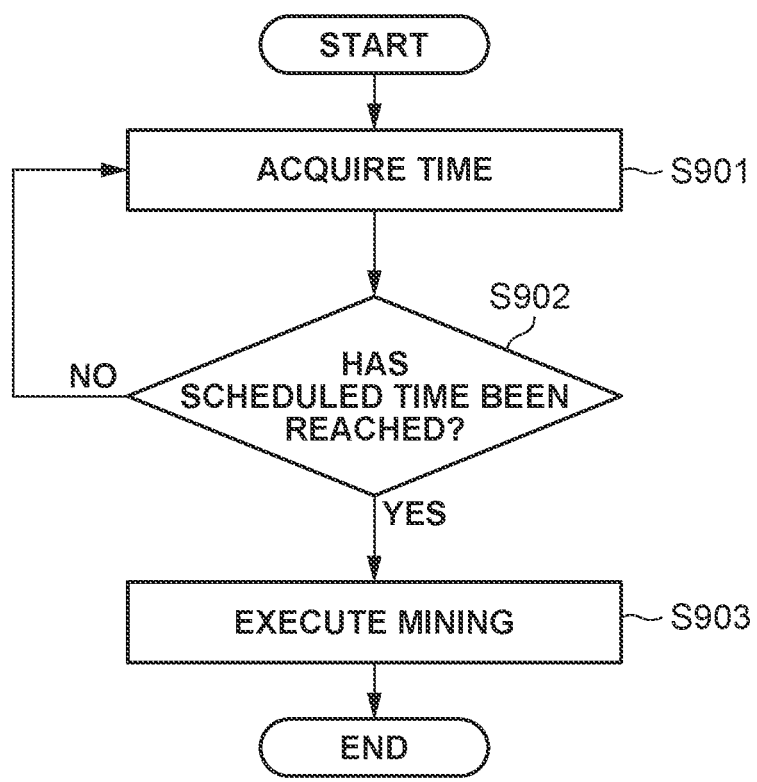
FIG. 9 is a flowchart illustrating one example of processing for executing scheduled mining.

FIG. 9 is a flowchart illustrating one example of processing for executing scheduled mining. The processing of the flowchart illustrated in FIG. 9 starts when the image forming apparatus 2 is turned on. In step S901, the CPU 201 acquires a time from the RTC 216. In step S902, the CPU 201 determines whether a scheduled time has been reached. In a case where the CPU 201 determines that the scheduled time has been reached (YES in step S902), the processing proceeds to step S903. In a case where the CPU 201 determines that the scheduled time has not been reached (NO in step S902), the processing returns to step S901. In step S903, the CPU 201 starts mining processing. The mining processing herein is processing substantially the same as the processing illustrated in FIG. 3.

Such processing is executed accordingly, so that processing time of a job to be executed by the image forming apparatus 2 can be prevented from lengthening due to execution of the mining processing.

A second exemplary embodiment is to be described. An image forming apparatus 2 is generally applied to a business case in which the number of printed sheets is recorded in a counter 223 and a sum is collected from a user later based on a counter value recorded in the counter 223. However, the image forming apparatus 2 may have a mining function. In such a case, a mining result can be provided, so that remuneration can be acquired from a block chain network 103. Hence, a sum no longer needs to be directly billed to a user. In the second exemplary embodiment, processing for executing mining based on a charging count is to be described with reference to FIGS. 7 and 8. Such processing is executed by a CPU 201 unless otherwise noted. A user sets "ON" by using a button 702 on a mining setting screen 7, and such a setting enables mining to be executed based on a charging count.

Figure 8:
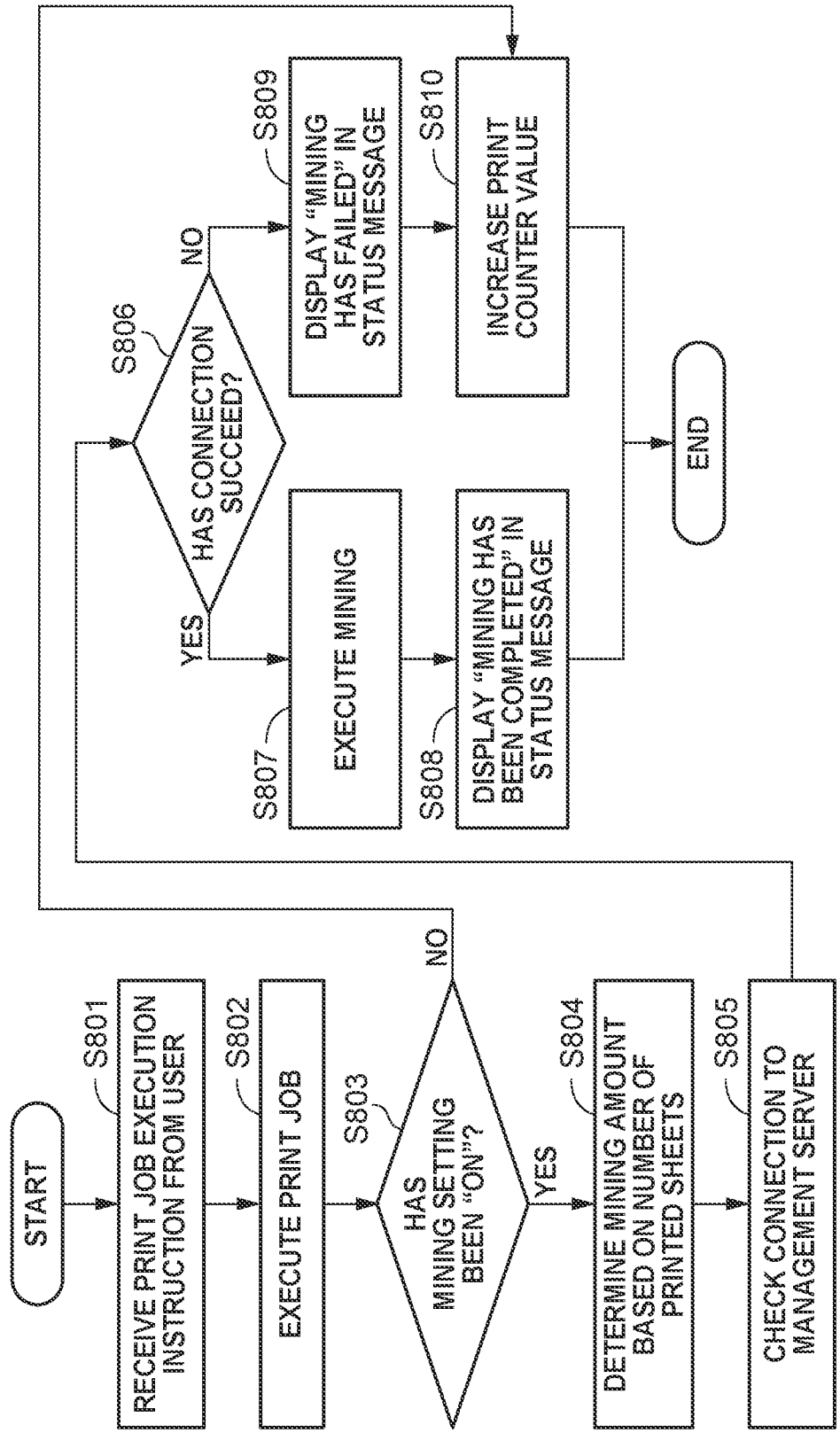
FIG. 8 is a flowchart illustrating one example of processing for executing mining processing based on a charging count.

FIG. 8 is a flowchart illustrating one example of processing for executing mining processing based on a charging count.

In step S801, the CPU 201 receives a print job execution instruction from a user. In step S802, the CPU 201 controls a printer 222 to execute a print job. In step S803, the CPU 201 determines whether a mining setting has been set to "ON" by using the button 702. In a case where the CPU 201 determines that the mining setting is "ON" (YES in step S803), the processing proceeds to step S804. In a case where the CPU 201 determines that the mining setting is not "ON" (NO in step S803), the processing proceeds to step S810.

In step S804, the CPU 201 determines a mining amount based on the number of printed sheets by the print job. Subsequently, in step S805, the CPU 201 checks connection to a predetermined management server 101. In step S806, the CPU 201 determines whether connection has succeeded. In a case where the CPU 201 determines that connection has succeeded (YES in step S806), the processing proceeds to step S807. In a case where the CPU 201 determines that connection has not succeeded (NO in step S806), the processing proceeds to step S809.

In step S807, the CPU 201 starts mining processing. The mining processing herein is processing substantially the same as the processing illustrated in FIG. 3.

In step S808, the CPU 201 displays "mining has been completed" in a status message in response to the end of the mining. In the processing illustrated in FIG. 8, the end of the mining is determined based on the mining amount determined in step S804. A certain amount of virtual currency is received as remuneration, and the mining ends.

In step S809, the CPU 201 displays "mining has failed" in the status message. In step S810, the CPU 201 increases a print counter value.

The processing of the flowchart has been described using a case in which mining is executed immediately after a print job is executed. However, mining can be executed when time that is set using the button 701 on the mining setting screen 7 has come.

With such processing, a result of the mining performed by the image forming apparatus 2 is transmitted, so that a provider of the image forming apparatus 2 receives remuneration from the block chain network 103. This can provide a new business model in which remuneration is acquired in virtual currency from the block chain network 103 instead of billing a user for a sum based on a counter value.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-124674, which was filed on Aug. 4, 2022 and which is hereby incorporated by reference herein in its entirety.

What is claimed is:

1. An image forming apparatus comprising:
one or more memories that stores a set of instructions; and
one or more processors that execute the set of instructions to:
receive an instruction for executing mining processing;
execute the mining processing; and
execute a job,
wherein, even if the one or more processors receive the instruction in a state that the job is being executed, the mining processing and the job are not executed at same time.

2. The image forming apparatus according to claim 1,
wherein, even if the instruction for executing the mining processing is received in a state that the job is being executed, the one or more processors do not start to execute the mining processing until execution of the job is finished.

3. The image forming apparatus according to claim 2,
wherein, in a case where an instruction for executing a predetermined job among a plurality of jobs executable by the image forming apparatus is received in a state that the mining processing is being executed, the one or more processors stop executing the mining processing, and
wherein, even if an instruction for executing a job different from the predetermined job is received in a state that the mining processing is being executed, the one or more processors do not stop executing the mining processing.

4. The image forming apparatus according to claim 1, wherein the one or more processors are further configured to receive an instruction for executing the job,
wherein, in a case where the instruction for executing the job is received in a state in which the mining processing is being executed, the one or more processors stop the mining processing and start executing the job.

5. The image forming apparatus according to claim 4,
wherein, even in a case where the instruction for executing the mining processing is received in a state in which a predetermined job, among a plurality of jobs executable by the image forming apparatus, is executed, the one or more processors do not start executing the mining processing until the execution of the job is finished, and
wherein, in a case where the instruction for executing the mining processing is received in a state in which a job different from the predetermined job is being executed, the one or more processors start executing the mining processing.

6. The image forming apparatus according to claim 1, wherein, in a case where the instruction for executing the mining processing is received in a state that the job is being executed, execution of the mining processing is cancelled.

7. The image forming apparatus according to claim 1, further comprising a printing unit configured to print an image on a sheet,
wherein the job is a print job for printing the image on the sheet.

8. The image forming apparatus according to claim 7, wherein the one or more processors are further configured to execute the mining processing based on a number of sheets printed by the printing unit.

9. The image forming apparatus according to claim 1, wherein the mining processing is calculation processing for generating a new block in a block chain.

10. An information processing method comprising:
receiving an instruction for executing mining processing;
executing the mining processing; and
executing a job,
wherein, even if the instruction is received in a state that the job is being executed, the mining processing and the job are not executed at a same time.

11. A non-transitory computer-readable storage medium storing a program for causing a computer to execute an information processing method, the information processing method comprising:
receiving an instruction for executing mining processing;
executing the mining processing; and
executing a job,
wherein, even if the instruction is received in a state that the job is being executed, the mining processing and the job are not executed at a same time.

* * * * *